Patented Sept. 18, 1945

2,385,078

UNITED STATES PATENT OFFICE 2,385,078

MANUFACTURE OF CUPROUS OXIDE

William J. Harshaw, and Carl J. Harbert, Shaker Heights, Ohio, assignors to The Harshaw Chemical Company, Elyria, Ohio, a corporation of Ohio No Drawing. Application October 14, 1944, Serial No. 558,732

4 Claims. (Cl. 23—147)

This invention relates to the preparation of cuprous oxide from cupric oxide.

We have discovered that under proper conditions cupric oxide will react with sulfur according to the formula:

$$4CuO + S \rightarrow 2Cu_2O + SO_2$$

When a mixture of CuO and sulfur in suitable proportions is heated in a non-oxidizing atmosphere in a temperature range from 650° C. to 1000° C., the above indicated reaction takes place with the advantage that reduction does not proceed beyond $Cu_2O$ to the formation of metallic copper whereas such reducing agents as carbon and hydrogen tend to reduce the CuO beyond $Cu_2O$ to produce metallic copper.

The proportions of CuO and sulfur which we prefer to employ are for each 100 parts by weight of CuO from 9 to 18 (preferably 10 to 15) parts by weight of sulfur, 10 parts being approximately theoretical according to the above reaction.

or rotary retorts. We prefer to use the rotary retort and to create within such retort an atmosphere of steam or of sulfur vapor and sulfurous gases by the use of an excess of sulfur where sulfur is the principal reducing agent or by utilizing a mixture of copper sulfide and sulfur where copper sulfide is the principal reducing agent. We may, for example, use theoretical proportions of CuO and CuS and then supply one atom of free sulfur for each two molecules of CuS. When the firing is in saggers, there is a tendency for the reaction to be incomplete in the center but a satisfactory product can be obtained in that way. If the hot product is removed to open air, the surface will reoxidize to CuO. This may be prevented by exclusion of air until the product is cool enough to be stored in closed drums. It may also be allowed to occur if a small proportion of CuO can be tolerated in the final product.

The following table indicates some successful batch compositions with temperatures and time and the nature of the resulting product:

| Source of CuO | Parts by weight of CuO | Reducing agent | Parts by weight of reducing agent | Temperature, degrees C. | Time in hours | Nature of cuprous oxide product |
|---|---|---|---|---|---|---|
| 50-50 mix $CuO + Cu_2O$ | 50 | CuS | 15 (12) | 750 | 1 | Fired in covered crucible. Dark surface. Bright red color. Slightly darker red center. Good quality. |
| 50-50 mix $CuO + Cu_2O$ | 50 | CuS | 20 (12) | 750 to 800 | 1 | Fired in covered crucible. Slightly bluish red color. Contained some $CuSO_4$. Fair quality. |
| 50-50 mix $CuO + Cu_2O$ | 50 | S | 6 (5) | 750 to 800 | 1 | Fired in covered sagger. Bluish tint in center only. Excellent quality. |
| 50-50 mix $CuO + Cu_2O$ | 50 | S | 5 (5) | 700 | 2 | Fired in covered crucible. Dark top surface. Bright red underneath. Excellent quality. |
| 50-50 mix $CuO + Cu_2O$ | 50 | S | 7.5 (5) | 750 to 800 | 1 | Fired in covered crucible. Red color with bluish-red center. Some $CuSO_4$ present. Fair quality. |
| 50-50 mix $CuO + Cu_2O$ | 50 | S | 10 (5) | 750 | 1 | Fired in covered crucible. Fair quality. $CuSO_4$ present. |

We may also use copper sulfide instead of sulfur, the reaction in that case being:

$$5CuO + CuS \rightarrow 3Cu_2O + SO_2$$

If we use CuS as the reducing agent, we prefer to use for each 100 parts by weight of CuO from 20 to 35 (preferably 24 to 30) parts by weight of CuS, 24 parts being approximately theoretical according to the above reaction.

Both in the case of sulfur and copper sulfide we prefer to operate with an excess of reducing agent as indicated by the preferred maximum proportions stated although that is not absolutely necessary. In fact, we may operate the process fairly successfully with a slight deficiency of reducing agent for the formulae stated. The heating may be carried out in saggers, crucibles, trays The experiments upon which the above table is based were performed with a source of copper oxide which happened to be most available and which contained approximately 50% CuO and 50% $Cu_2O$. We have demonstrated that the $Cu_2O$ merely acts like an inert material in this reaction and may be neglected except, of course, the fact that it must be heated along with the reacting materials. The color is a very good means for determining the completeness of the conversion since CuO is black and $Cu_2O$ is bright red (or yellow if the particle size is small enough). In the table we have shown in parentheses in the fourth column the theoretical weight of reducing agent required for reactions set forth above.

We have experienced some difficulty in respect to eliminating copper sulfate from the product. It is, however, not always necessary to avoid the presence of copper sulfate altogether and, being water soluble, it can be washed out when its presence cannot be tolerated. We do obtain products with as little as 0.2% of copper sulfate.

Having thus described our invention, what we claim is:

1. A process of producing cuprous oxide from cupric oxide which comprises heating a mixture of cupric oxide and a reducing agent of the class consisting of sulfur and copper sulfide and mixtures thereof to a temperature between 650° C. and 1000° C., the proportions being from 9 to 18 parts of reducing agent to 100 parts of CuO by weight in the case of sulfur and from 20 to 35 parts of reducing agent to 100 parts of CuO by weight in the case of CuS, and proportionally in the case of mixtures, and the heating being carried out in a non-oxidizing atmosphere.

2. A process of producing cuprous oxide from cupric oxide which comprises heating a mixture of cupric oxide and a reducing agent of the class consisting of sulfur and copper sulfide and mixtures thereof to a temperature between 650° C. and 1000° C., the proportions being from 9 to 18 parts of reducing agent to 100 parts of CuO by weight in the case of sulfur and from 20 to 35 parts of reducing agent to 100 parts of CuO by weight in the case of CuS, and proportionally in the case of mixtures, and the heating being carried out in a non-oxidizing atmosphere and washing the product with water to remove the copper sulfate content therefrom.

3. A process of producing cuprous oxide from cupric oxide which comprises heating a mixture of cupric oxide and a reducing agent of the class consisting of sulfur and copper sulfide and mixtures thereof to a temperature between 650° C. and 1000° C., the proportions being from 9 to 18 parts of reducing agent to 100 parts of CuO by weight in the case of sulfur and from 20 to 35 parts of reducing agent to 100 parts of CuO by weight in the case of CuS, and proportionally in the case of mixtures, and the heating being carried out in a rotary retort within which is maintained an atmosphere consisting principally of steam and sulfurous vapors and from which air is largely excluded.

4. A process of producing cuprous oxide from cupric oxide which comprises heating a mixture of cupric oxide and a reducing agent of the class consisting of sulfur and copper sulfide and mixtures thereof to a temperature between 650° C. and 1000° C., the proportions being from 10 to 15 parts of reducing agent to 100 parts of CuO by weight in the case of sulfur and from 24 to 30 parts of reducing agent to 100 parts of CuO by weight in the case of CuS, and proportionally in the case of mixtures, and the heating being carried out in a non-oxidizing atmosphere.

WILLIAM J. HARSHAW.
CARL J. HARBERT.